Jan. 15, 1963
R. W. MOWELL ETAL
3,073,343
CARGO LOADING APPARATUS
Filed May 19, 1960
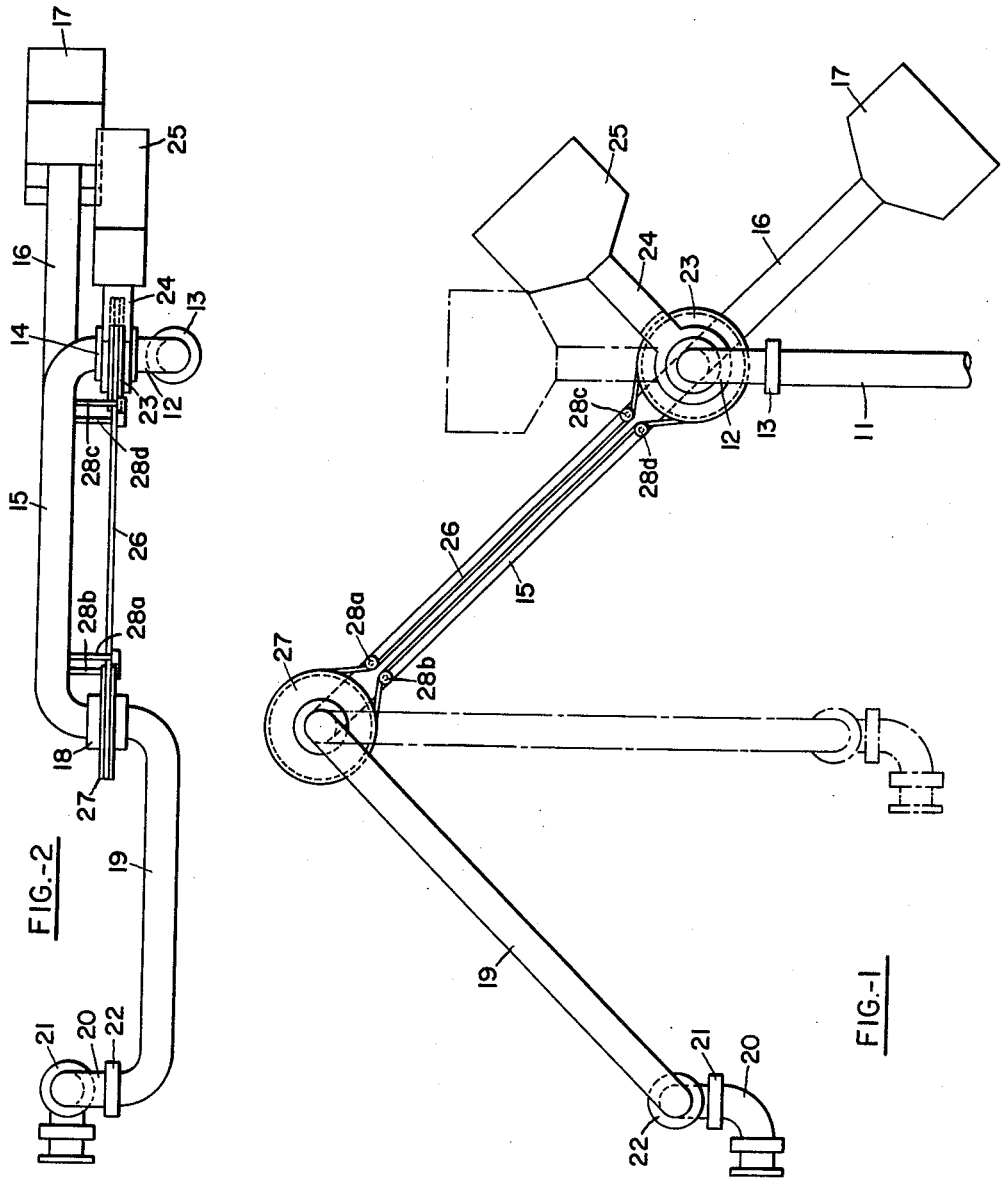
Roger W. Mowell
John R. Peet      Inventors
By W. V. T. Heilman
Patent Attorney 3,073,343
CARGO LOADING APPARATUS
Roger W. Mowell, West Caldwell, and John R. Peet, Westfield, N.J., assignors to Esso Research and Engineering Company, a corporation of Delaware
Filed May 19, 1960, Ser. No. 30,375
8 Claims. (Cl. 137—615)

The present invention relates to an apparatus for the transfer of fluids and pipeline transferable cargo. More particularly, the apparatus is concerned with a substantially counterbalanced marine cargo transfer apparatus for the transfer of petroleum products to and from marine vessels and the like, which apparatus is substantially counterbalanced in all operating positions.

In the prior art, marine loading equipment, sometimes referred to as cargo transfer devices and/or hose handling rigs, has been normally mounted on docks and wharves and supported by combinations of cranes with multiple pulley and cable arrangements. The heavy metal pipe connections between the marine vessel and the shore facilities have required substantial supporting structures and operating equipment. Hence, in the past, marine loading facilities have required complex and expensive operating equipment with many maintenance problems.

It is the object of the present invention to overcome many of the foregoing difficulties and to reduce and simplify the structural and operating requirements and equipment needed for the transfer of cargo. More particularly, it is an object of this invention to eliminate the need for substantial supporting structural equipment, to reduce forces exerted on tanker piping and manifolds, to reduce the maintenance problem associated with the use of multiple combinations of pulleys, cables and the like, and to simplify the construction of new marine loading rigs. These and other objects will be apparent from the more detailed description of the invention which will follow and which will be more fully understood from the accompanying drawings.

FIGURE 1 is a side elevational view of the inventive apparatus in a partially extended position. FIGURE 2 is a top view of the inventive apparatus in a partially extended position.

Referring now to FIGURE 1 in more detail, there is shown a rigid pipe or support base 11, which is supported in any suitable manner in a dock, wharf or any foundation structure for rigid mounting. On top of this riser is located an S type swivel joint 12, which allows for horizontal plane rotation about the lower swivel bearing 13, while the upper swivel joint bearing 14 connects with the right angled lower section of the inner boom pipe arm 15 and allows pivotal movement of the inner arm in a vertical plane, substantially parallel to the riser 11. Extending rearward from the inner arm 15 where it is pivotally attached to the riser is an extension arm 16 having integrally mounted on its farther end a counterweight 17.

At the forward and upper end of the inner boom arm 15 is a pivoted S swivel joint 18 which connects to the upper end of the outer boom arm 19 and which allows pivotal movement of the inner and outer boom arms in a vertical plane substantially parallel to the riser 11. Swivelly pivoted at the lower end of the outer arm is connected a double elbow 20 pivoted at 21 and 22 to allow for both horizontal and vertical movement, and which in operation connects to the marine tanker manifold or other suitable connecting means.

Obviously, both simple swivel joint connections 18 and 12 may be substituted with an alternate type of swing joint, so as to avoid eccentric loading with particularly heavy boom arm structures and pipes. An alternate type of swing joint that is suitable would be a Y type of joint with the swivel connection located in the middle of the Y arms so as to avoid eccentric loading. This type of connection, although suitable, unlike the simple S pivot connection, places certain restrictions on the position of the outer boom arm at rest when the inner boom arm is in an elevated rest position.

Surrounding the stationary pivot point 14 is rotatably mounted an inner sheave 23 which is free to rotate about the swivel 14. This sheave has rigidly mounted and attached on the outer side a counterweight arm 24, which has a counterweight 25 integrally mounted on its farther end. The inner sheave 23 is connected by a cable 26 to an outer rotatable sheave 27 of substantially the same diameter. The outer sheave 27 is rigidly mounted to the outer boom arm and pivoted about the swivel joint 18. Cable guides 28a, b, c and d are located along the side of the inner boom arm to help guide the cable 26, to keep it under suitable tension and to maintain the cable in its proper position. It is, of course, recognized that the device would operate satisfactorily without the cable guides and that sheaves 23 and 27 could be fitted with sprockets for use of a chain instead of cable 26.

From the above description, it will be understood that the weight of the counterweight 17 and the length of the arm extension 16 can be chosen by varying either the weight or the length of the arm from the center of gravity which is located about the swivel joint 14. The weight and length are chosen so as to substantially counterbalance the weight of the inner boom arm in all positions and the outer boom arm when it is in its rest or substantially vertical position.

The term substantially counterbalanced will be used to designate that condition wherein either one or both of the boom arms is or are not fully counterbalanced. In the substantially counterbalanced apparatus, the failure of the motive means of operating the apparatus or, when the apparatus is in a free unbiased state, gravity would allow the apparatus to assume a rest position. A rest position is that position wherein the inner boom arm has its counterbalanced end in the low position so that the inner and outer boom arms are in a substantially vertical position. In the preferred form of the invention, the inner boom arm and the outer boom arm, when in a substantially vertical position would be overbalanced either full or empty to the extent of not more than approximately 105%, where about 100% represents a state of true counterbalance. In addition, the outer boom arm would be underbalanced either full or empty to the extent of not more than approximately 95%. Thus, on failure of the motive means, the overbalanced inner arm would tilt backward, while the underbalanced outer boom would return to a substantially vertical position. In the preferred form then, substantial counterbalancing means a counterbalancing force or means within 5% of a true absolute counterbalance.

To explain it in another manner, the sum of the moments about the swivel joint 14 is made approximately equal to zero, so that the length of the extension arm 16 and the weight of the counterweight 17 will substantially counterbalance or fully counterbalance the weight of the inner and outer boom arms when the inner boom arm is in any position and the outer boom arm is in a substantially vertical position. Thus, if $W_i$ represents the total weight of the inner boom arm, $W_o$ the total weight of the outer boom arm and double elbow, $W_c$ the total weight of the counterweight 17, $W_A$ the total weight of the arm extension 16, $y$ the distance between the center of gravity of the counterweight and the pivot point 14, $x$ the length of the inner boom arm, $z$ the length from the center of gravity of the arm extension to the pivot point, $w$ the length from the center of gravity of the inner arm to the pivot point, and $\theta$ the vertical angle between the arm extension 16 and the riser 11, then to obtain substantial counterbalancing in all operating positions:

$$[(W_c)(y \sin\theta)+(W_A)(z \sin\theta)]$$
$$-[(W_i)(w \sin\theta)+(W_o)(x \sin\theta)]=0$$

As can be seen from the above well known equation, the various elements of the present inventive device can be quantitatively adjusted so long as the above equation is satisfied. The flexibility and simplicity of the apparatus to various loading and structural conditions is thus demonstrated.

The same principles of counterbalancing would also apply to the counterweight 25 and the counterweight arm 24. In operation, the counterweight system 17 and 16 functions to substantially or fully and automatically counterbalance the inner boom arm in all operating positions and to substantially or fully counterbalance the outer boom arm as if the outer boom arm is in a substantially vertical position. The counterweight 25 and the counterweight arm 24 counterbalance the outer boom arm when it is in any operating position, i.e. when it is rotated in a vertical plane substantially parallel to the pipe riser 11 about the swivel joint 18. Thus, as the outer boom arm is rotated forward or backward out of a substantially vertical position, the outer sheave rotates a proportional amount which by the cable or chain means rotates the inner sheave so as to bring about a proportional counterbalancing effect by the rotation in the opposite direction of the counterweight 25 and the counterweight arm 24 which is rigidly attached to the rotatable inner sheave 23. The combined effect of the cooperation of the dual counterweighting masses is to provide substantial or fully automatic counterbalancing of both the inner and outer arms at all times and in all positions. In another manner of explanation, it can be said that the outer arm counterbalancing system operates to maintain the sum of the moments at zero or substantially zero by counterbalancing the changes in the moment of the outer arm when its center of gravity is displaced by its vertical plane movements.

In the general preferred and simple practice, the apparatus is constructed to provide for a fully counterbalanced system, wherein the apparatus is capable of movement by manual means. There are certain occasions when the preferred apparatus will be an apparatus that is substantially counterbalanced. In this case, the inner boom arm and the outer boom arm in a substantially vertical or rest position is slightly overbalanced and the outer boom arm slightly underbalanced. In this state, upon failure of the motive operating means of the apparatus or other similar conditions, the inner and outer boom arms will each gradually retract and assume, by means of gravitational forces, a substantially vertical rest position. The safety aspects of this particular construction are thus apparent.

In a fully counterbalanced state, the inventive device can be manually swivelled about any of the swivel joints since the device remains in balance in all positions. It is, of course, within the contemplation of this invention that modifications by reversible pneumatic, hydraulic, gear, motor, and the like means of supplying reversible motive power can be utilized to provide horizontal and vertical movement to the movable parts of the device. For example, one modification might be the installation of a slewing motor to create suitable horizontal motion about swivel joint 13 and in the vertical plane to control the movement of both the inner and/or outer arm. For another example, the outer arm could be controlled in both forward and backward motion in its vertical plane by an appropriately mounted ring gear driven by a reversible motor or other suitable means. Also, it is within the contemplation of this invention that the cable means controlling the motion of the outer arm can be substituted for by other means such as suitably mounted hydraulic or pneumatic automatic cylinders, chains, and the like.

In its simpler and more economic phase, the apparatus as shown is suitable; with motive means for driving cables and/or controlling the boom arms, preferred for larger and more complex operations where the pipe arms, either full or empty, are of considerable length and/or weight.

The description of the above-designed apparatus has been directed mainly toward the loading arms in an empty condition, but it is within the contemplation and scope of this invention that the apparatus may be suitably counterbalanced when the conduit loading arms have transfer cargo in them. Substantial counterbalancing may be accomplished under these conditions by considering the weight of the fluid in each conduit arm. Counterbalancing can then be accomplished by designing the apparatus so that the counterweights 17 and 25 are hollow or partially hollow so as to allow an additional and suitable amount of solid or liquid ballast to be added to increase the weight of the counterweights. Other modifications within the scope of the present invention to provide for counterweighting of the apparatus with cargo in the conduit are means to make counterweights 17 and 25 movable along the extension arm 16 and the counterweight arm 24. These means would then allow the appropriate adjustment in lever arm lengths to provide for counterbalancing or substantially counterbalancing the additional weight of the fluid. Suitable means or combinations for the accomplishment of this purpose are: fluid operated cylinders, such as pneumatic or hydraulic cylinders whereby the cylinder piston rod is used to move the counterweight; geared track arrangements with motive or manual means to adjust position of the counterweights along the track, and the like.

In FIGURE 1, the relative positions of the outer boom arm and the counterweight 25, when the outer boom arm is in a rest position, are shown by the use of dotted lines. Thus, when the outer boom arm is in a substantially vertical position, the counterweight 25 assumes a nonoperating position by being rotated by the movement of the outer boom arm to the vertical position shown. This location of the counterweight 25 to an approximate position over the pivot point 14 of the riser and the inner boom arm allows the inner boom arm in any operating position and the outer boom arm in the rest position to be counterbalanced by the counterweight system 16 and 17.

FIGURE 2 is a top view of the inventive apparatus in a partially extended position as in FIGURE 1; and by virtue of the foregoing description regarding FIGURE 1 and its operation, FIGURE 2 needs little further explanation. This view makes clearer the relative position of the counterweight systems, the sheaves, and the swivel joints. As can be seen, counterweights 25 and 17 are so designed that they can pass each other to allow maximum flexibility in the positioning of the arms.

It can now be seen that the use of the cargo transfer device of the invention will: (1) Permit very low weight loads on the marine tanker manifolds, (2) substantially eliminate the need for expensive rigid supporting structures, (3) reduce the use of cables, pulleys, hoists, and the like and corresponding maintenance and lubrication problems inherent with their use, (4) allow the economic construction of suitable marine loading rigs, (5) render modification of existing marine transfer rigs quite simple and inexpensive, (6) permit the counterbalancing or substantial counterbalancing of the inner and outer boom arms in all operating positions, (7) increase safety by substantially counterbalancing the apparatus so that upon power failure and the like it will assume a safe rest position, and otherwise allow desirable advantages to be obtained in the handling and transportation of cargo.

The inventive features of this apparatus can also be profitably employed in other areas where normally heavy inner and outer boom arms are utilized, such as in cranes, aircraft cargo transfer such as lighter-than-air blimps and the like, the transfer of cargo between vessels at sea and the like, and wherever random motion of one or both of the cargo transfer mediums makes cargo transfer operations difficult and normally places undue stress and weight on the transfer manifolds.

What is claimed is:

1. An apparatus which comprises in combination: a support base; an inner boom arm pivotally connected to the support base; an outer boom arm pivotally connected to the inner boom arm; a first counterbalancing means to substantially counterbalance the inner boom arm; and a second counterbalancing means being mounted for rotation relative to the outer boom arm and rotatable in response to the movement of the outer boom arm from a vertical position to change its moment arm in a direction and an amount to substantially counterbalance the outer boom arm as it moves from said vertical position whereby the first and second counterbalancing means substantially counterbalances both the inner and outer arms in all operating positions.

2. The apparatus of claim 1 wherein said first counterbalancing means is a counterweight connected to the inner boom arm.

3. The apparatus of claim 1 wherein said second counterbalancing means comprises a counterweight means connected to the inner boom arm and means connecting said counterweight means to the outer boom arm.

4. A fluid loading apparatus which comprises in combination a standpipe through which fluid products are introduced or discharged; an inner pipe boom arm having one end and another end and which is pivotally connected to and in fluid communication at the one end with the standpipe; an outer pipe boom arm having a one end and a terminal end and which is pivotally connected to and in fluid communication at the one end with the other end of the inner boom arm; a first counterbalancing means to substantially counterbalance the inner boom arm, and a second counterbalancing means connected to the inner boom arm, said second counterbalancing means being mounted for rotation relative to the outer boom arm and rotatable in response to the movement of the outer boom arm from a vertical position to change its moment arm in a direction and an amount to substantially counterbalance the outer boom arm as it moves from said vertical position whereby the first and second counterbalancing means substantially counterbalance both the inner and outer arms in all operating positions.

5. The fluid loading apparatus of claim 4 wherein said second counterbalancing means comprises counterweight means and means connecting the said counterweight means to the outer boom arm.

6. The apparatus as defined in claim 4 wherein said standpipe is adapted for rotational movement about the vertical axis.

7. The apparatus as defined in claim 4 wherein said outer boom has at its terminal end connective means for transferring fluids to and from fluid containers.

8. An apparatus for the transfer of fluid products from and to marine vessels and the like, which apparatus comprises in combination: a standpipe firmly mounted in a relatively fixed position and adapted for rotational movement about its vertical axis and through which standpipe fluid products enter or are discharged; an inner pipe boom arm having a one end and another end and which is pivotally connected to and in fluid communication at the one end with the standpipe, which boom arm is adapted for movement in a plane substantially parallel to the standpipe; an outer pipe boom arm having a one end and a terminal end and which is pivotally connected to and in fluid communication at the one end with the other end of the inner boom arm, which boom arm is adapted for movement in a plane substantially parallel to the plane of movement of the inner boom arm and the standpipe; a first counterbalancing means comprising a counterweight connected to the inner boom arm to substantially counterbalance the inner boom arm; a second counterbalancing means comprising a counterweight connected to a rotatable moment arm on the inner boom arm which moment arm is mounted for rotation relative to the outer boom arm and means connecting the counterbalancing means to the outer boom arm, said second counterweight being rotatable in response to the movement of the outer boom arm from a vertical position to change its moment arm in a direction and an amount to substantially counterbalance the outer boom arm as it moves from said vertical position whereby the first and second counterbalancing means substantially counterbalance both the inner and outer arms in all operating positions.

References Cited in the file of this patent

UNITED STATES PATENTS

| | | |
|---|---|---|
| 2,361,214 | Krone | Oct. 24, 1944 |
| 2,927,607 | Bily | Mar. 8, 1960 |